United States Patent
Müssig et al.

(10) Patent No.: US 9,796,160 B2
(45) Date of Patent: Oct. 24, 2017

(54) ASYMMETRICAL MULTI-LAYERED MEMBRANE FOR ELECTROACOUSTIC TRANSDUCERS

(71) Applicant: TESA SE, Hamburg (DE)

(72) Inventors: Bernhard Müssig, Seevetal (DE); Yeliz Tepe, Hamburg (DE); Michael Egger, Hamburg (DE)

(73) Assignee: TESA SE, Norderstedt (DE)

( * ) Notice: Subject to any disclaimer, the term of this patent is extended or adjusted under 35 U.S.C. 154(b) by 526 days.

(21) Appl. No.: 14/399,986

(22) PCT Filed: Apr. 25, 2013

(86) PCT No.: PCT/EP2013/058582
§ 371 (c)(1),
(2) Date: Nov. 10, 2014

(87) PCT Pub. No.: WO2013/174609
PCT Pub. Date: Nov. 28, 2013

(65) Prior Publication Data
US 2015/0125692 A1   May 7, 2015

(30) Foreign Application Priority Data
May 21, 2012 (DE) .......... 10 2012 208 477

(51) Int. Cl.
*B32B 27/06* (2006.01)
*B32B 27/08* (2006.01)
(Continued)

(52) U.S. Cl.
CPC ............. *B32B 27/08* (2013.01); *B29C 51/14* (2013.01); *B32B 7/12* (2013.01); *B32B 27/285* (2013.01);
(Continued)

(58) Field of Classification Search
CPC ... B42B 27/06; B42B 27/08; Y10T 28/13284; H04R 2201/003
(Continued)

(56) References Cited

U.S. PATENT DOCUMENTS 4,762,748 A * 8/1988 Oberle .................... B32B 27/08
428/34.9
5,221,728 A * 6/1993 Bennett .................. C08G 61/12
528/125

(Continued)

FOREIGN PATENT DOCUMENTS

DE    40 12 589 A1   10/1991
DE    41 40 499 A1   6/1993
(Continued)

OTHER PUBLICATIONS

International Search Report of PCT/EP2013/058582 dated Jul. 19, 2013.
(Continued)

*Primary Examiner* — Holly Le
(74) *Attorney, Agent, or Firm* — Norris McLaughlin & Marcus, P.A.

(57) ABSTRACT

A multi-layered laminate for producing membranes for electroacoustic transducers, comprises a first layer of a polyether ether ketone film having a heat of crystallisation of at least 15 J/g, a second layer (of a thermoplastic plastic film having a heat of crystallisation of no more than 5 J/g, and an adhesive layer arranged between the first and second layers. Alternatively, the first and second layers are defined by their shrinkage properties after 15 minutes at 200° C.: the first layer has shrinkage of more than 10% in at least one direction, and the second layer has shrinkage of less than 10% in the longitudinal and transverse directions. A laminate constructed in this manner exhibits lower fold formation when processed using multi-cavity thermoforming. The
(Continued)

laminates are useful for the production of membranes for electroacoustic transducers.

9 Claims, 1 Drawing Sheet

(51) Int. Cl.
| H04R 7/10 | (2006.01) |
| H04R 7/12 | (2006.01) |
| H04R 31/00 | (2006.01) |
| B29C 51/14 | (2006.01) |
| B32B 7/12 | (2006.01) |
| B32B 27/28 | (2006.01) |
| B32B 27/30 | (2006.01) |
| H04R 1/00 | (2006.01) |
| B29K 71/00 | (2006.01) |
| B29K 101/12 | (2006.01) |
| B29L 31/34 | (2006.01) |

(52) U.S. Cl.
CPC .......... *B32B 27/288* (2013.01); *B32B 27/308* (2013.01); *H04R 1/00* (2013.01); *H04R 7/10* (2013.01); *H04R 7/125* (2013.01); *H04R 31/003* (2013.01); *B29K 2071/00* (2013.01); *B29K 2101/12* (2013.01); *B29L 2031/3418* (2013.01); *B32B 2250/03* (2013.01); *B32B 2250/24* (2013.01); *B32B 2250/40* (2013.01); *B32B 2307/10* (2013.01); *B32B 2333/08* (2013.01); *B32B 2371/00* (2013.01); *H04R 2231/001* (2013.01); *H04R 2307/025* (2013.01); *Y10T 428/269* (2015.01); *Y10T 428/31721* (2015.04); *Y10T 428/31786* (2015.04); *Y10T 428/31942* (2015.04)

(58) Field of Classification Search
USPC ................ 428/212, 213, 214, 480, 483, 501
See application file for complete search history.

(56) References Cited

U.S. PATENT DOCUMENTS

| 7,644,801 B2 | 1/2010 | Klein et al. | |
| 7,726,441 B2 | 6/2010 | Uryu et al. | |
| 8,496,086 B2 * | 7/2013 | Gerkinsmeyer | H04R 7/10 |
| | | | 181/169 |
| 8,945,704 B2 | 2/2015 | Shibata et al. | |
| 2006/0222202 A1 | 10/2006 | Uryu et al. | |
| 2006/0281381 A1 | 12/2006 | Fujitani et al. | |
| 2007/0223773 A1 | 9/2007 | Tripp et al. | |
| 2010/0236861 A1 * | 9/2010 | Her | H04R 7/02 |
| | | | 181/164 |
| 2010/0288579 A1 | 11/2010 | Gerkinsmeyer | |
| 2011/0272208 A1 | 11/2011 | Shen | |
| 2013/0129990 A1 | 5/2013 | Shibata et al. | |

FOREIGN PATENT DOCUMENTS

| DE | 10 2007 030 665 A1 | 1/2009 |
| EP | 2 172 059 A2 | 4/2010 |
| EP | 2 271 137 A1 | 1/2011 |
| JP | H 01174100 A | 7/1989 |
| JP | 2006 295245 A | 10/2006 |
| JP | 2009 154296 A | 7/2009 |
| JP | 2011 166210 A | 8/2011 |
| JP | 2012 2081748 A | 4/2012 |
| WO | 2012 018099 A1 | 2/2012 |

OTHER PUBLICATIONS

German Search Report issued in priority application DE 10 2012 208 477.0 dated Apr. 24, 2013.

* cited by examiner

ASYMMETRICAL MULTI-LAYERED MEMBRANE FOR ELECTROACOUSTIC TRANSDUCERS

This application is a 371 of International Patent Application No. PCT/EP2013/058582, filed Apr. 25, 2013, which claims foreign priority benefit under 35 USC §119 of German Application No. 10 2012 208 477.0 filed May 21, 2012, the disclosures of which are incorporated herein by reference.

The invention relates to an asymmetrical multilayer laminate for use as membrane for electroacoustic transducers, and also to a process for the production of said multilayer laminate.

In view of the general trend towards smaller and more compact devices in the consumer electronics sector, another essential requirement is a constant reduction of size of the loudspeakers present in cellphones, smart phones, headphones, personal digital assistants (PDAs), notebooks, etc. These are increasingly stringent requirements in relation to the acoustic properties and the lifetime of membranes of said micro loudspeakers, the size of which is typically in the range from 20 mm² to 900 mm².

In general terms, the material of a loudspeaker membrane should simultaneously have maximum stiffness, minimum weight, and good damping properties. These requirements derive from the fact that the frequency at which sub-oscillations of the membrane begin, and from which increased resonance and distortion phenomena occur, is proportional to $(E/\rho)^{0.5}$, where E is the modulus of elasticity and ρ is the density of the membrane. It is therefore possible to raise the upper limit of the frequency range of the loudspeaker by increasing the factor $(E/\rho)^{0.5}$. Other advantages of a membrane that has low weight and at the same time is stiff are rapid acceleration of the membrane during pulse transmission, and therefore higher achievable acoustic pressure. On the other hand, the membrane should at the same time have high internal damping tan δ, in order to lower the resonant frequency $f_0$ and suppress resonance peaks in the frequency response. Since, however, the criteria of stiffness, lower weight, and good damping represent contradictory design requirements, loudspeaker membranes always require acceptance of a certain degree of compromise in relation to the membrane material, or else selection of a combination of stiff and damping layers.

The membrane materials most commonly used are paper, metal, and plastic, and these are often also coated or modified in order to obtain maximum possible compliance with the requirements mentioned. Paper has low density and good damping properties, and the lack of stiffness can by way of example be mitigated via reinforcement with glass fibers or with Kevlar fibers. Metals have high stiffness, but generally combine this with poor damping properties, therefore often giving a sound that is tinny, harsh, and metallic. The damping properties of metal foils (aluminum, titanium, beryllium) can be improved by, for example, producing composites with a middle layer made of soft polymers or of foams having damping properties. Advantages of plastics membranes are that they comprise a very wide range from soft polymers having good damping properties to very stiff materials providing little damping, and that they can be selected appropriately for various particular applications. These plastics membranes are based either on impregnated textiles or on foils, the stiffness or damping properties of these often being optimized via combination with stiff and, respectively, damping layers.

EP 2 172 059 A describes a 5-layer loudspeaker membrane in which there is a stiff polyetheretherketone foil adhesively-bonded by way of a thermoplastic adhesive layer on each side of a carbon-fiber nonwoven that has damping properties. US 2011-0272208 A describes a 5-layer laminate in which there are stiff external layers applied on both sides of an adhesive-coated polyethylene terephthalate backing. U.S. Pat. No. 7,644,801 A mentions a 3-layer laminate made of 2 polyarylate foils and of an acrylate adhesive therebetween; when said laminate is compared with simple polyarylate foils, it exhibits less buckling and crinkling.

These examples show that multilayer laminates in principle have good suitability as loudspeaker membranes, but despite the large number of different variants no ideal solution has yet been found.

Because the membranes of micro loudspeakers are subject to a high degree of heating during operation, they often use stiff foils made of high-temperature-resistant plastics such as polyetheretherketone (PEEK), polyetherketone (PEK), polyetherketoneketone (PEKK), polyarylate (PAR), polyetherimide (PEI), polyphenylene sulfide (PPS), polyethylene terephthalate (PET), polyethylene naphthalate (PEN), polybutylene terephthalate (PBT), or aramids. The micro loudspeaker membranes are either formed directly from foils of this type or formed from multilayer laminates of said foils with additional damping layers. The term membrane in this text denotes the molded membrane as used in the finished loudspeaker, formed from foils or foil composites. The expression multilayer laminate in this text means a composite from which the actual loudspeaker membrane is formed, made of at least two foils and of additional layers located between said foils.

Membranes made of polyetheretherketone, hereinafter PEEK, have exceptional resistance to temperature change, and provide the best performance in the increasingly important high-performance-lifetime tests used by loudspeaker manufacturers, and specifically for micro loudspeakers there is therefore a clear observable trend toward the use of PEEK. For the abovementioned reasons, there is very great interest in membranes made of multilayer laminates of PEEK with additional damping layers, because PEEK has high stiffness.

The PEEK foils used for the production of the multilayer laminates are obtainable commercially in both amorphous and semicrystalline form. Amorphous or essentially amorphous PEEK foils are cooled during their production to temperatures below the glass transition temperature $T_g$ sufficiently rapidly to prevent formation of any substantial crystalline domains in the material. These essentially amorphous PEEK foils crystallize only when heating above the glass transition temperature during the shaping of the membrane via thermoforming or embossing. In contrast, semicrystalline PEEK foils have a crystalline fraction immediately after they have been produced. An essentially amorphous PEEK foil can be distinguished from a semicrystalline PEEK foil via differential scanning calorimetry (DSC).

DSC 204 F1 equipment from Netzsch was used for DSC on amorphous and semicrystalline PEEK foils. For this, about 5 mg of the foil were weighed into a 25 μl aluminum crucible with perforated cover, and heated from 20° C. to 410° C. at a heating rate of 10 K/min. The heat absorbed and, respectively, dissipated during this procedure is recorded, and the resultant curve is termed first heating curve. The sample was then in turn cooled to 20° C. at a cooling rate of 10 K/min, and during this procedure the cooling curve was recorded. Finally, a second heating curve was recorded by heating the sample again from 20° C. to 410° C. at a heating rate of 10 K/min.

The two types of foil differ in that when amorphous PEEK foils are subjected to measurement under said conditions they exhibit a significant exothermic crystallization peak in the first heating curve; said peak is absent in the case of the semicrystalline PEEK foil. A PEEK foil that is essentially amorphous for the purposes of this invention is characterized in that under the abovementioned DSC conditions it exhibits heat of crystallization of at least 15 J/g (i.e. 15 J/g or more) in the first heating curve. A PEEK foil that is semicrystalline for the purposes of this invention is characterized in that under the abovementioned DSC conditions it exhibits a heat of crystallization of at most 5 J/g (i.e. 5 J/g or less) in the first heating curve. This upper limit is based on potential variations of the baseline during measurement; the semicrystalline PEEK foil generally exhibits no crystallization peak in the first heating curve.

For reasons of better processability during the shaping process, loudspeaker membranes mainly use multilayer laminates made of amorphous PEEK foils. Crystallization of these multilayer laminates occurs during thermoforming at temperatures above the glass transition temperature of 143° C. The PEEK foils in the finished membrane are therefore in the semicrystalline state, and they therefore provide higher stiffness and strength of the subsequent membrane.

The thickness of the thermoformed membrane can be adjusted very successfully via the process conditions during the thermoforming process; a multilayer PEEK laminate with a given total thickness can therefore be used to produce different membrane thicknesses respectively appropriate to the requirements of various loudspeaker designs. The disadvantage of this process is a high scrap rate, since the finished membrane comprises only a very small fraction, depending on the degree of thermal forming, of the multilayer laminate used. Specifically for very expensive PEEK foils, the thermoforming process is therefore not cost-effective.

In the case of the multicavity thermoforming process, the membrane comprises a far greater proportion of the multilayer laminate, but there is little scope for membrane thickness variation. Since the resonant frequency of the membrane is proportional to its total thickness, achievement of low resonant frequencies requires use of thin multilayer laminates, and therefore also thin PEEK foils, as starting materials of the thermoforming process. The thickness of the thinnest amorphous PEEK foils currently obtainable commercially is 6 µm. Despite the high level of interest in multilayer laminates made of these foils, said foils could hitherto not be used because severe creasing occurs during the multicavity thermoforming process on the side that, in the thermoforming mold, is upward and facing toward the atmosphere.

Surprisingly, it has now been found that the creasing problem can be eliminated if the amorphous PEEK foil that is upward in the thermoforming mold is replaced by a semicrystalline PEEK foil. Use of this type of asymmetrical multilayer laminate made of an essentially amorphous PEEK foil, adhesive layer, and semicrystalline PEEK layer therefore permits the production of thin membranes made of multilayer PEEK laminates by means of the multicavity thermoforming process.

In fact it has been found that other materials which either cannot crystallize or have already completed full crystallization can replace one of the two amorphous PEEK foils.

The invention therefore provides a multilayer laminate for the production of membranes for electroacoustic transducers, comprising a) a first layer (for the purposes of this document termed "first outer layer") made of a polyetheretherketone foil (PEEK foil) with heat of crystallization of at least 15 J/g (i.e. 15 J/g or more; heat of crystallization $Q_{cr} \geq 15$ J/g), determined in the first heating curve in differential scanning calorimetry—i.e. of an essentially amorphous PEEK foil, b) a second layer (for the purposes of this document termed "second outer layer") made of a thermoplastic foil with a heat of crystallization of at most 5 J/g (i.e. 5 J/g or less; heat of crystallization $Q_{cr} \leq 5$ J/g), determined in the first heating curve in differential scanning calorimetry—i.e. of a foil of this type which is essentially not capable of crystallization or is not capable of further crystallization, and
c) an adhesive layer arranged between the first and second outer layer.

BRIEF DESCRIPTION OF THE DRAWINGS

The invention will now be described in greater detail with reference to the drawings, wherein.

The multilayer laminate can be restricted to the three layers mentioned, but can also have further layers in the laminate structure.

Figure 1:
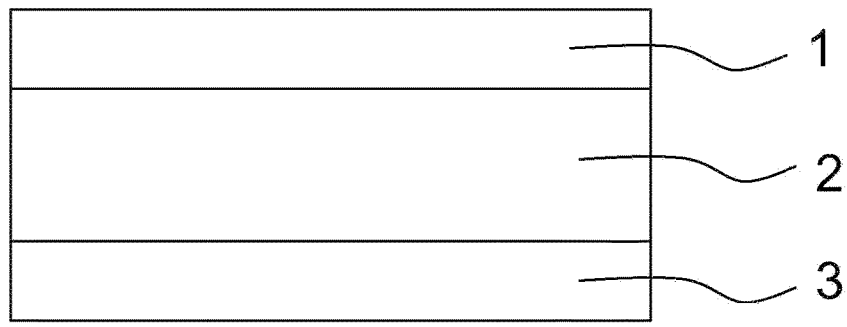
FIG. 1 is a schematic showing a 3-layer laminate according to the invention made of semicrystalline PEEK foil (1), adhesive (2), and amorphous PEEK foil (3.

A 3-layer laminate made of semicrystalline PEEK foil (1), adhesive (2), and amorphous PEEK foil (3) is shown by way of example in FIG. 1.

A material that has been found to be particularly suitable in the invention for the purposes of the second outer layer is a semicrystalline PEEK foil, i.e. a PEEK foil which has heat of crystallization of at most 5 J/g, determined in the first heating curve in differential scanning calorimetry.

Other foils suitable for the purposes of the invention for use as second outer layer—i.e. as replacement for one of the two amorphous PEEK foils of conventional structures—are by way of example foils made of polyphenylene sulfide (PPS), polyethylene naphthalate (PEN), polyethylene terephthalate (PET), polybutylene terephthalate (PBT), polyarylate (PAR), polyimide (PI), polyetherimide (PEI), polyphenyl sulfone (PPSU), polyether sulfone (PES), or polysulfone (PSU).

Foils used as second outer layer preferably have thicknesses in the range from 1 µm to 50 µm, preferably from 2 µm to 40 µm, particularly preferably from 5 µm to 15 µm.

The amorphous PEEK foils for the first outer layer in the asymmetrical multilayer laminate likewise—independently of the thicknesses of the foils for the second outer layer—has thicknesses in the range from 1 µm to 50 µm, preferably from 2 µm to 40 µm, particularly preferably from 5 µm to 15 µm.

It is possible here to select the same thickness for the amorphous first outer layer and the second outer layer that is the layer not capable of crystallization.

When the properties of the abovementioned foils that can be used as second outer layer are compared with those of the amorphous PEEK foil obtainable commercially, it is found that the shrinkage of foils that are not capable of crystallization, in particular foils of the abovementioned materials with heat of crystallization of at most 5 J/g, is markedly smaller than the shrinkage of the amorphous PEEK foil. Comparative values are shown by way of example in table 1.

TABLE 1

Shrinkage of various foils at 200° C. for 15 min.

| | Morphology | Shrinkage MD/% | Shrinkage TD/% |
|---|---|---|---|
| PEEK 6μ (Victrex, Aptiv 2000-006GS) | amorphous | 19 | 4 |
| PEEK 9μ (Victrex, Aptiv 2000-009GS) | amorphous | 12 | 4 |
| PEEK 8μ (Victrex, Aptiv 1000-008GS) | semi-crystalline | 2 | −2 |
| PPS 9μ (Toray, Torelina 3030) | semi-crystalline | 2 | 0.5 |
| PPSU 9μ (Ajedium) | amorphous | 0.5 | 0 |
| PAR 10μ (Lofo, Aryphan N681 EM) | amorphous | 6 | 5 |
| PET 12μ (Toray, Lumirror 60.01) | semi-crystalline | 4 | 1 |

The invention therefore further provides a multilayer laminate for the production of membranes for electroacoustic transducers, comprising a first layer, the shrinkage of which in at least one direction after 15 minutes at 200° C. is greater than 10%, an adhesive layer arranged between the first and second outer layer, and a second outer layer, the shrinkage of which in longitudinal and transverse directions respectively after 15 minutes at 200° C. is less than 10%, preferably less than 5%. It is preferable to use, as foils for the first and the second outer layer, foils of the type described hereinafter; the statements made in relation to said foils apply correspondingly to said multilayer laminate.

The shrinkage of the foils is determined by using a foil marker at room temperature to make two markings 10 cm apart on the foil, and suspending the foils freely for 15 minutes at 200° C. in a conventional oven. After cooling, the distance between the two markings is again measured, and the percentage change in the distance is determined. This measurement is made both in the longitudinal direction of the foil—also called machine direction or MD—and in the transverse direction of the foil—also called transverse direction or TD—in order to record the different shrinkage, depending on orientation.

In the multilayer laminate of the invention, there is an intermediate layer made of an adhesive arranged between the amorphous PEEK foil and the semicrystalline PEEK foil. The function of this layer is stable bonding of the foils located above and below, and damping of the oscillation of the stiff external foils.

Suitable adhesives are polyacrylates dissolved in solvents, or are aqueous polyacrylate dispersions, or else are rosin-modified natural and synthetic rubber. Polyacrylate adhesives in solution are particularly suitable here.

It is preferable to apply the adhesive layer by coating from solvent or from water with the aid of a nozzle or of a doctor blade onto the first outer layer—in particular onto an amorphous PEEK foil of thickness from 6 μm to 12 μm, and then to dry the material for from 5 to 30 minutes at from 100 to 170° C. The second outer layer—in particular a semicrystalline PEEK foil of thickness from 6 μm to 12 μm, preferably 8 μm—is then laminated onto the dried adhesive.

The thickness of the adhesive after drying is from 2 μm to 100 μm, preferably from 5 μm to 50 μm, particularly preferably from 10 μm to 30 μm.

The multilayer laminates of the invention can be used with exceptional results in a process for the production of membranes for electroacoustic transducers, where they are subjected to the multicavity thermoforming process. In this process the multilayer laminate is placed onto the heatable thermoforming mold which comprises depressions which replicate, in negative form, the membrane that is to be formed. The multilayer laminate is then heated, for example via IR radiation, and thus softened, and then forced from above into the depressions by compressed air.

Alternatively, it is also possible to use a ram made of silicone or of foamed silicone to force the softened multilayer laminate into the molds. The membranes of the invention, produced by this process, exhibited markedly less creasing than membranes made of two amorphous PEEK foils of thickness from 6 to 9 μm with adhesive layer located therebetween.

Figure 2:
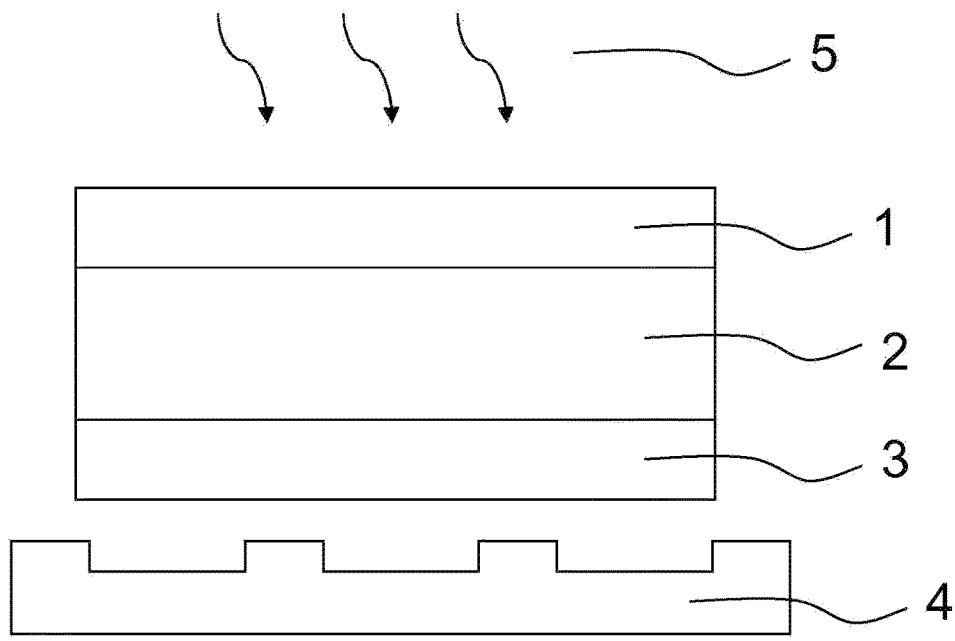
FIG. 2 is a schematic showing an advantageous arrangement of the laminate of the invention in the thermoforming mold (4), which, after heating by compressed air (5), is forced into the depressions of the thermoforming mold.

FIG. 2 shows an advantageous arrangement of the laminate of the invention in the thermoforming mold. Reference signs 1 to 3 here describe the multilayer laminate as described for FIG. 1. This multilayer laminate is placed onto the preferably heated thermoforming mold 4 and, after heating by compressed air (5), is forced into the depressions of the thermoforming mold.

Finally, the invention also provides the use of the multilayer laminates described for the purposes of this document for the production of membranes for electroacoustic transducers.

The example below is intended to illustrate the invention, without any intention of restricting it.

EXAMPLE 1

Aptiv 2000-006GS amorphous PEEK foil from Victrex, thickness 6 μm, is coated with a thickness of 20 μm of an acrylate adhesive, and is then dried at 120° C. for 5 minutes. Aptiv 1000-008GS semicrystalline PEEK foil, thickness 8 μm, is then applied onto the adhesive layer, and laminated thereto via application of pressure by a roller in the manner that excludes bubbles. An area of about 10 cm by 10 cm is cut out from this multilayer laminate, and is placed onto the thermoforming mold in such a way that the amorphous PEEK foil is in contact with the heated embossing mold and the semicrystalline foil faces upward. The laminate is then heated in the thermoforming mold and forced into the form of the finished membrane via application of pressure. In contrast to multilayer laminates made of two amorphous PEEK foils of thickness from 6 to 9 μm with adhesive layer located therebetween, the PEEK foil here facing upward and toward the compressed air is not affected by the creasing problem.

What is claimed is:

1. A multilayer laminate for the production of membranes for electroacoustic transducers, comprising
    a first layer ("first outer layer") made of a polyetheretherketone foil ("PEEK foil") with heat of crystallization of at least 15 J/g, determined in the first heating curve in differential scanning calorimetry,
    a second layer ("second outer layer") made of a thermoplastic foil with a heat of crystallization of at most 5 J/g, determined in the first heating curve in differential scanning calorimetry, and
    an adhesive layer arranged between the first and second outer layer.

2. The multilayer laminate as claimed in claim 1, wherein the second outer layer is composed of an at least semicrystalline PEEK foil.

3. The multilayer laminate as claimed in claim 1, wherein the second outer layer is composed of a plastic of which the main constituent is selected from the group consisting of polyethylene terephthalate, polybutylene terephthalate, polyethylene naphthalate, polyetherimide, polyimide, polyarylate, polyphenyl sulfide, polyphenyl sulfone, polysulfone, and polyether sulfone.

4. The multilayer laminate as claimed in claim 1, wherein the thicknesses of the two outer layers are respectively from 1 μmm to 50 μm.

5. The multilayer laminate as claimed in claim 1, wherein the thickness of the adhesive layer is from 2 μm to 100 μm.

6. A process for the production of membranes for electroacoustic transducers made of a multilayer laminate as claimed in claim 1, said process comprising multicavity thermoforming.

7. An electroacoustic transducer comprising a multilayer laminates as claimed in claim 1.

8. An electronics device comprising an electroacoustic transducer according to claim 7.

9. A multilayer laminate for the production of membranes for electroacoustic transducers, comprising
- a first layer ("first outer layer"), the shrinkage of which in at least one direction after 15 minutes at 200° C. is greater than 10%,
- a second layer ("second outer layer"), the shrinkage of which in longitudinal and transverse direction respectively after 15 minutes at 200° C. is less than 10%, and
- an adhesive layer arranged between the first and second outer layer.

* * * * *

UNITED STATES PATENT AND TRADEMARK OFFICE
CERTIFICATE OF CORRECTION

PATENT NO. : 9,796,160 B2
APPLICATION NO. : 14/399986
DATED : October 24, 2017
INVENTOR(S) : Bernhard Müssig, Yeliz Tepe and Michael Egger Page 1 of 1

It is certified that error appears in the above-identified patent and that said Letters Patent is hereby corrected as shown below:

In the Claims

Column 7, Line 10, "1 μmm" -- should read -- 1 μ --.

Signed and Sealed this
Twenty-fourth Day of April, 2018

Andrei Iancu
*Director of the United States Patent and Trademark Office*